Patented Nov. 7, 1933

1,934,675

UNITED STATES PATENT OFFICE 1,934,675

METHOD OF PREPARING TETRACHLOROBENZENE

Lindley E. Mills, Midland, Mich., assignor to The Dow Chemical Company, Midland, Mich., a corporation of Michigan No Drawing. Application March 2, 1931
Serial No. 519,684

5 Claims. (Cl. 260—161)

This invention is concerned with the preparation of chlorinated hydrocarbons, particularly with an improved method of preparing 1:2:4:5-tetrachlorobenzene.

Methods for preparing polychlorobenzenes of the present type usually consist in passing chlorine into benzene in the presence of a small amount of iron in finely divided condition or other suitable catalyst, thus obtaining various mixtures of the different compounds in question. In these methods the temperature of chlorination of the benzene is maintained at about 60° C. or above to avoid the separation of para-dichlorobenzene which forms in large quantities and is further chlorinated slowly at lower temperatures. However, at higher temperatures, in these processes, in addition to the formation of 1:2:4:5-tetrachlorobenzene, the other isomers thereof also are obtained and considerable quantities of the still higher chlorinated benzenes form. The regular procedure, then, is to separate said mixture by repeated fractionation in order to recover the several components thereof. Because of the large number of the chlorinated benzene compounds that are formed in the aforementioned method of chlorination the separation of the individual compounds has not resulted satisfactorily; furthermore, the yield of 1:2:4:5-tetrachlorobenzene has been generally unsatisfactory.

I have now found that 1:2:4:5-tetrachlorobenzene may be advantageously obtained in good yields and in a relatively pure form free from admixture with other polychlorobenzenes by chlorinating ortho-dichlorobenzene at a temperature materially lower than that above referred to, and the tetrachlorobenzene thus formed crystallizes directly from the reaction mixture. The use of ortho-dichlorobenzene as a starting material is practical in view of the same being produced in large quantities as a by-product in other processes. The commercial product contains a relatively small amount of para-dichlorobenzene as an impurity, but the latter in such proportion does not crystallize out and, when chlorinated, also forms the compound desired. The compound, 1:2:4:5-tetrachlorobenzene, thus obtained is used as an intermediate product in producing certain chlorinated phenols having a high germicidal value and for other purposes. My invention, then, consists of the method hereinafter fully described and particularly pointed out in the claims, the following description setting forth in detail a mode of carrying out the invention, such disclosed mode illustrating, however, but one of various ways in which the principle of the invention may be used.

In proceeding according to the invention, I preferably chlorinate a commercial ortho-dichlorobenzene, i. e. a mixture containing about 80 to 95 per cent or more of ortho-dichlorobenzene and the remainder consisting principally of para-dichlorobenzene. A chlorinator equipped with a strong agitator and with means for temperature control is preferable for this purpose. To carry out the chlorination, a batch of the ortho-dichlorobenzene is measured into the chlorinator, a catalyst added, if desired, and chlorine introduced with agitation, the temperature of the reacting mixture being maintained between approximately 20° and 30° C. during the reaction. An effective cooling system is needed to accomplish this temperature control, as considerable heat is produced in the reaction. The introduction of the chlorine is continued until agitation becomes difficult due to the formation and separation of crystals of the tetrachlorobenzene. At this point the supply of chlorine is cut off, the HCl blown out by air, the reaction mixture cooled to around 15° to 20° C. and the crystals, which are substantially pure 1:2:4:5-tetrachlorobenzene, may be filtered out or separated in other suitable manner, washed with cold ortho-dichlorobenzene and, subsequently further purified by recrystallization from monochlorobenzene or other suitable solvent. The impure crystals of the tetrachlorobenzene crystallized directly from ortho-dichlorobenzene mother liquor have a melting point range only slightly less than that of the purified product, e. g. impure product 133° to 135° C.; purified product about 139° C. By one or more recrystallizations of the product from monochlorobenzene a pure product of melting point of 138° C. may be obtained.

Preferably, in place of a single, or batch, chlorination process, a continuous chlorination may be carried out employing the mother liquor and ortho-dichlorobenzene wash solution from a former batch and adding thereto sufficient fresh ortho-dichlorobenzene to make up for that converted in the previous reaction and for mechanical losses. Such mother liquors may be thus used repeatedly without the crystallized tetrachlorobenzene product made therefrom becoming excessively impure due to accumulation of the other chlorinated benzene derivatives therein. An increased yield of final product per chlorination may also be had wherein the mother liquors are used as above described. The monochlorobenzene recrystallization liquors, which may be allowed to accumulate from several batches, may be subsequently distilled, the monochlorobenzene obtained thereby being suitable for reuse as solvent, while the residual mother liquor therefrom may be added to the raw material to be chlorinated. The hydrochloric acid formed in the process may be absorbed in water or other solvent in the regular manner.

I have found that, by maintaining a temperature range between about 20° and 30° C. in the chlorinating step of my process, the formation of 1:2:4:5-tetrachlorobenzene is especially favored while the formation of other chlorinated products is restricted, so that the tetrachlorobenzene thus formed and crystallized out is obtained substantially free from isomeric tetrachlorobenzenes, and of good purity. This feature particularly distinguishes the process from those hitherto employed which were conducted at higher temperatures. At lower temperatures than those just stated the speed of reaction is reduced, while at higher temperatures the proportion of other higher polychlorobenzene derivatives formed tends to increase materially, contaminating the crystal product or remaining in the mother liquor and making the same more or less unsuitable for further use. Under the conditions of procedure described the trichlorobenzene formed consists almost entirely of the 1:2:4 isomer, practically all of which is held dissolved in the mother liquor and, when later subjected to further chlorination, is largely converted to the desired 1:2:4:5-tetrachlorobenzene.

Usual chlorinating catalysts such as finely divided iron, ferric chloride, aluminum chloride, etc., are suitable for use in carrying out the chlorination step of the process. The ortho-dichlorobenzene employed may be pure or may contain a minor proportion of para-dichlorobenzene. However, I preferably limit the quantity of the para-isomer to less than 20 per cent; otherwise at the low temperatures for chlorinating specified in my process the same tends to crystallize out and contaminate the desired tetrachlorobenzene crystals. Other impurities, such as benzene, chlorobenzene or trichlorobenzene, may be present in small amount in the ortho-dichlorobenzene employed. However, ortho-dichlorobenzene of a good degree of purity appears best suited to my purpose.

The following example will illustrate a preferred way of carrying out my improved method for the preparation of tetrachlorobenzene but it is understood that my invention is not limited thereto.

Example 1

125 pounds of ortho-dichlorobenzene containing as impurity approximately 5 per cent para-dichlorobenzene, and one-tenth pound of anhydrous ferric chloride was charged into an iron clorinator vessel equipped for temperature control and vigorous agitation and connected to means for disposing of the hydrochloric acid formed in the reaction of the process. The ortho-dichlorobenzene charge was cooled to about 20° C. and, with stirring, dry chlorine was introduced. By controlling the rate of flow of the chlorine and the temperature of the cooling means a temperature not exceeding approximately 30° C. was maintained. Chlorination was continued until a heavy slurry of crystals was present in the reaction mixture. The supply of chlorine was now cut off and air blown through the reaction mixture to remove hydrochloric acid. Such reaction mixture was cooled to about 15° C. and crystals of 1:2:4:5-tetrachlorobenzene separated and washed with cold ortho-dichlorobenzene wash solution, which was then combined with the mother liquor from the crystals. The following table shows results obtained in a series of five successive chlorinations, the first of which is described in the above example. In each chlorination step after the first, the mother liquor and ortho-dichlorobenzene wash solution from the previous step, together with a quantity of fresh ortho-dichlorobenzene, was employed.

| Batch | 1 | 2 | 3 | 4 | 5 |
|---|---|---|---|---|---|
| A. Wt. charge to be chlorinated, lbs | 125 | 171 | 186 | 185 | 187 |
| B. Wt. chlorine reacted, lbs | 80 | 64 | 62 | 60 | 65 |
| C. Wt. 1:2:4:5-tetrachlorobenzene crystals, lbs | 13 | 48 | 59 | 58 | 61 |
| D. Wt. o-dichlorobenzene used for washing crystals, lbs | 6 | 13 | 15 | 15 | 15 |
| E. Sp. gr. of mother liquor at 15° C | 1.582 | 1.580 | 1.579 | 1.584 | 1.581 |
| F. Wt. mother liquor and wash liquor, lbs | 156 | 171 | 170 | 167 | 169 |
| G. New o-dichlorobenzene used to make up new batch, lbs | 15 | 15 | 15 | 20 | -------- |

The above table is largely self-explanatory. However, attention is called particularly to the regularity of specific gravity values in Item E which indicates a close uniformity of composition of the mother liquor even after being reused several times. From a consideration of the specific gravity values of the principal constituents of such mother liquor, e. g. ortho-dichlorobenzene, 1.3104; 1:2:4-trichlorobenzene, 1.574; and tetrachlorobenzene, 1.858, the composition of the several batches thereof is apparently practically identical. The mother liquor, accordingly, consisted of largely 1:2:4-trichlorobenzene containing small quantities of unreacted ortho-dichlorobenzene and dissolved tetrachlorobenzene, and merely traces of the higher chlorinated benzenes. By further chlorinating such mother liquor in a succeeding step the trichlorobenzene therein is converted to tetrachlorobenzene. The accumulation in the mother liquor of other tetrachlorobenzenes, such as the 1:2:3:4 and 1:2:3:5 isomers, is slow, so that a great number of runs may be had with the mother liquors according to my method without experiencing a very material building up of such isomers.

An outstanding feature of the herein described improved method is that a substantially pure compound, 1:2:4:5-tetrachlorobenzene, is prepared directly in good yield, instead of a mixture of polychlorobenzenes difficult, if not impossible, of separation into the individual components. This result is attained by chlorinating at a temperature below about 30° C., employing a raw material such that para-dichlorobenzene is not present or formed in large enough amount to crystallize out in the reaction mixture. By returning the mother liquors to the process the utilization of raw materials is carried to a high degree, and the production of undesired by-products is almost negligible.

Other modes of applying the principle of my invention may be employed instead of those explained, change being made as regards the method herein disclosed, provided the means stated by any of the following claims or the equivalent of such stated means be employed.

I therefore particularly point out and distinctly claim as my invention:—

1. The method of preparing 1:2:4:5-tetrachlorobenzene which comprises reacting ortho-dichlorobenzene with approximately two molecular equivalents of chlorine at a temperature between about 20° and about 30° C., cooling the reaction mixture and separating the crystals of 1:2:4:5-tetrachlorobenzene.

2. The method of preparing 1:2:4:5-tetrachlorobenzene which comprises reacting ortho-dichlorobenzene with chlorine at a temperature between about 20° and about 30° C. in the presence of a nuclear chlorination catalyst to such a concentration that a substantial separation of 1:2:4:5-tetrachlorobenzene crystals is obtained, cooling the mixture to a temperature of approximately 15° to 20° C. and separating the crystals of 1:2:4:5-tetrachlorobenzene from the mother liquor.

3. The method of preparing 1:2:4:5-tetrachlorobenzene which comprises reacting an ortho-dichlorobenzene mother liquor containing as impurities principally other chlorobenzenes, with chlorine at a temperature between about 20° and about 30° C. to such a concentration that a substantial separation of 1:2:4:5-tetrachlorobenzene crystals is obtained, cooling the mixture to a temperature between about 15° and about 20° C., separating the crystals of 1:2:4:5-tetrachlorobenzene product from said mother liquor and recrystallizing said product.

4. The method of preparing 1:2:4:5-tetrachlorobenzene which comprises chlorinating ortho-dichlorobenzene at a temperature not exceeding about 30° C. until a thick crystal slurry is formed, separating the crystals from the mother liquor and returning the latter to the first step.

5. The method of preparing 1:2:4:5-tetrachlorobenzene which comprises chlorinating ortho-dichlorobenzene at a temperature not exceeding about 30° C. until a thick crystal slurry is formed, separating the crystals from the mother liquor, washing the crystals with ortho-dichlorobenzene and returning the mother liquor and washings to the first step.

LINDLEY E. MILLS.